(12) United States Patent
Xie et al.

(10) Patent No.: US 9,581,745 B2
(45) Date of Patent: Feb. 28, 2017

(54) WIRE GRID POLARIZER AND METHOD FOR FABRICATING THE SAME

(71) Applicant: Samsung Display Co. Ltd., Yongin, Gyeonggi-Do (KR)

(72) Inventors: Lei Xie, Suwon-si (KR); Tae Woo Kim, Seoul (KR); Dae Ho Yoon, Seoul (KR); Moon Gyu Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 66 days.

(21) Appl. No.: 14/667,437

(22) Filed: Mar. 24, 2015

(65) Prior Publication Data
US 2016/0154158 A1  Jun. 2, 2016

(30) Foreign Application Priority Data

Nov. 28, 2014  (KR) ........................ 10-2014-0168553

(51) Int. Cl.
*G02B 5/30* (2006.01)
(52) U.S. Cl.
CPC .................................. *G02B 5/3058* (2013.01)
(58) Field of Classification Search
None
See application file for complete search history.

(56) References Cited

U.S. PATENT DOCUMENTS

| 2010/0119778 | A1 | 5/2010 | Lee et al. | |
| 2013/0270223 | A1* | 10/2013 | Lee | G03F 7/031 216/24 |
| 2014/0144875 | A1* | 5/2014 | Lim | G02B 5/3058 216/24 |
| 2016/0266295 | A1* | 9/2016 | Cho | G02B 5/3058 |

FOREIGN PATENT DOCUMENTS

| JP | 2006-049401 | 2/2006 |
| KR | 1020050017871 A | 2/2005 |
| KR | 1020060030997 A | 4/2006 |
| KR | 1020090001371 A | 1/2009 |
| KR | 1020110020450 A | 3/2011 |

* cited by examiner

*Primary Examiner* — Derek S Chapel
(74) *Attorney, Agent, or Firm* — Innovation Counsel LLP (57) ABSTRACT

A method for fabricating a wire grid polarizer according to an embodiment comprises: forming a conductive layer on a substrate; forming a guide layer on the conductive layer; forming a hard mask pattern to partially expose the guide layer; forming a guide pattern to partially expose the conductive layer; providing a block copolymer of two monomers having different etching rates; forming two sets of monomer blocks by aligning the block copolymer; selectively removing one set of monomer blocks; and forming a conductive wire pattern using the remaining set of monomer blocks and the guide pattern as etching masks. A width of an upper end of the guide pattern adjacent to the hard mask pattern is smaller than a width of a lower end adjacent to the conductive layer. The width of the upper end of the guide pattern is smaller than a width of the hard mask pattern.

17 Claims, 10 Drawing Sheets

WIRE GRID POLARIZER AND METHOD FOR FABRICATING THE SAME

CROSS-REFERENCE TO RELATED APPLICATION

This application claims priority from Korean Patent Application No. 10-2014-0168553 filed on Nov. 28, 2014 in the Korean Intellectual Property Office, and all the benefits accruing therefrom under 35 U.S.C. 119, the contents of which in its entirety are herein incorporated by reference.

TECHNICAL FIELD

The present disclosure relates to a wire grid polarizer and a method for fabricating the same.

BACKGROUND

A parallel conductive wire array in which parallel conductive wires are arranged to polarize a specific polarized light component in an electromagnetic wave is generally referred to as a wire grid polarizer.

If the distance between the parallel conductive wires is shorter than the wavelength of an incident electromagnetic wave, the wire grid polarizer reflects a polarized light component (an S wave) that is parallel to the conductive wires and transmits a vertical polarized light component (a P wave) that is perpendicular to the conductive wires. In this manner, only light having a specific polarization is transmitted by the wire grid polarizer. The wire grid may have excellent polarization efficiency, a high transmittance, and a wide viewing angle. Furthermore, the wire grid polarizer allows reuse of the reflected polarized light component, unlike an absorbing polarizer.

SUMMARY

The present system and method provide a method for fabricating a wire grid polarizer in accordance with a process having a reduced defective rate, a wire grid polarizer fabricated using the fabricating method and a display device including the wire grid polarizer.

Technical objects of the present system and method are not limited to those mentioned above. Other technical objects not expressly mentioned above can be understood by those of ordinary skill in the art from the following descriptions.

According to an exemplary embodiment of the present system and method, there is provided a method for fabricating a wire grid polarizer, the method comprising: forming a conductive layer on a substrate; forming a guide layer on the conductive layer; forming a hard mask pattern on the guide layer to partially expose the guide layer; forming a guide pattern to partially expose the conductive layer by patterning the guide layer using the hard mask pattern as an etching mask; providing a block copolymer of two monomers having different etching rates in a space defined by the conductive layer and the guide pattern; forming two sets of monomer blocks by aligning the block copolymer of two monomers; selectively removing one set of the two sets of monomer blocks; and forming a conductive wire pattern by patterning the conductive layer using the remaining set of monomer blocks and the guide pattern as etching masks, wherein a width of an upper end of the guide pattern adjacent to the hard mask pattern is smaller than a width of a lower end of the guide pattern adjacent to the conductive layer, and the width of the upper end of the guide pattern is smaller than a width of the hard mask pattern.

The forming of the hard mask pattern and the guide pattern on the conductive layer may include: forming a hard mask layer on the guide layer; forming a sacrificial layer on the hard mask layer; forming a photoresist pattern on the sacrificial layer to expose a part of the sacrificial layer; forming a sacrificial pattern by etching the sacrificial layer to expose a part of the hard mask layer; forming a mask material layer on the sacrificial pattern and the exposed hard mask layer; forming a mask pattern by etching the mask material layer to expose the sacrificial pattern and a part of the hard mask layer; forming the hard mask pattern by etching the hard mask layer exposed by the mask pattern; and forming the guide pattern by etching the guide layer exposed by the hard mask pattern.

The forming of the guide pattern may include isotropically etching the guide layer and anisotropically etching the guide layer.

The isotropic etching may include plasma-etching the guide layer with a first plasma intensity, and the anisotropic etching may include plasma-etching the guide layer with a second plasma intensity lower than the first plasma intensity.

The width of the upper end of the guide pattern may be smaller than the width of the hard mask pattern due to the isotropic etching.

The forming of the guide pattern may include plasma etching, and the plasma etching may include gradually adjusting the plasma intensity from the first plasma intensity for the isotropic etching to the second plasma intensity for the anisotropic etching.

The aligning of the block copolymer may include heat annealing or solvent annealing the block copolymer.

The aligning of the block copolymer may include swelling the block copolymer, and the guide pattern and the hard mask pattern may prevent the swelling block copolymer from brimming over.

The hard mask pattern layer may include a metal selected from a group consisting of chrome, molybdenum, and a combination thereof.

The guide pattern may be formed such that a longitudinal cross-section of the guide pattern has a trapezoidal shape or a bottle shape having a bottle neck.

The guide layer may be formed of silicon nitride (SiNx).

The method for fabricating a wire grid polarizer may further comprise: removing the hard mask pattern after the aligning of the block copolymer.

According to another exemplary embodiment of the present system and method, there is provided a wire grid polarizer comprising: a substrate; a plurality of conductive wire patterns located on the substrate; and a guide pattern disposed on a first subset of the conductive wire patterns; wherein a width of an upper end of the guide pattern is smaller than a width of a lower end of the guide pattern.

The wire grid polarizer may further comprise: a monomer block disposed on a second subset of the conductive wire patterns.

The guide pattern may be formed of silicon nitride (SiNx).

The guide pattern may be formed such that a longitudinal cross-section of the guide pattern has a trapezoidal shape or a bottle shape having a bottle neck.

According to another exemplary embodiment of the present system and method, there is provided a display device comprising: a protection layer disposed on a wire grid polarizer; a gate line formed on the protection layer and extending in a first direction; a data line insulated from the gate line and extending in a second direction; a thin film transistor electrically connected to the gate line and the data line; and a pixel electrode electrically connected to the thin film transistor, wherein the wire grid polarizer includes a plurality of conductive wire patterns located on a substrate; and a guide pattern disposed on a first subset of the conductive wire patterns; and a width of an upper end of the guide pattern is smaller than a width of a lower end of the guide pattern.

The display device may further comprise: a monomer block disposed on a second subset of the conductive wire patterns.

The guide pattern may be formed such that a longitudinal cross-section of the guide pattern has a trapezoidal shape or a bottle shape having a bottle neck.

The embodiments of the present system and method have at least the following effects.

It is possible to provide a method for fabricating a wire grid polarizer with a high yield and a wire grid polarizer fabricated by the method thereof.

The effects according to the present system and method are not limited to the contents exemplified above. Various other effects are included in the present specification.

BRIEF DESCRIPTION OF THE DRAWINGS

The above and other features and advantages of the present system and method are more apparent when the embodiments described below are considered in conjunction with the attached drawings in which.

DETAILED DESCRIPTION OF THE EMBODIMENTS

Although advantages and features of the present system and method of accomplishing the same are described with respect to exemplary embodiments and with reference to the accompanying drawings, the present system and method may be embodied in many different forms and are not limited to the embodiments set forth herein. Rather, these embodiments are provided to help convey the concept of the present system and method to those of ordinary skill in the art. Like reference numerals refer to like elements throughout the specification.

The terminology used herein for describing particular embodiments is not limiting of the present system and method. As used herein, the singular forms "a", "an" and "the" include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element or layer is referred to as being "on", "connected to" or "coupled to" another element or layer, it may be directly on, connected or coupled to the other element or layer, or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

Although the terms first, second, etc. may be used herein to describe various elements, components, regions, layers and/or sections, these elements, components, regions, layers and/or sections are not limited by these terms. These terms are only used to distinguish one element, component, region, layer or section from another element, component, region, layer or section. Thus, a first element, component, region, layer or section may be referred to as a second element, component, region, layer or section without departing from the teachings of the present disclosure.

Spatially relative terms, such as "beneath", "below", "lower", "above", "upper", and the like, may be used herein to describe one element or feature's relationship to another element(s) or feature(s) as illustrated in the figures. The spatially relative terms, however, are also intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" encompasses both an orientation of above and below, depending on the orientation of the device relative to that shown in the figures. That is, in whichever way the device may be oriented (e.g., rotated 90 degrees or at other orientations), the spatially relative descriptors used herein are to be interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are contemplated. Thus, these embodiments are not limited to the particular shapes of regions illustrated herein but include deviations in shapes that result, for example, from manufacturing.

For example, an implanted region illustrated as a rectangle may have rounded or curved features and/or a gradient of implant concentration at its edges, rather than a binary change from an implanted region to a non-implanted region. Likewise, a buried region formed by implantation may result in some implantation in the region between the buried region and the surface through which the implantation takes place. Thus, the regions illustrated in the figures are schematic in nature, and their shapes may not illustrate the actual shape of a region of a device and do not limit the scope of the present system and method.

Unless otherwise defined, all terms (including technical and scientific terms) used herein have the meaning as commonly understood by one of ordinary skill in the art to which the present system and method belong. That is, terms not expressly defined herein, including those defined in commonly used dictionaries, have a meaning that is consistent with their meaning in the context of the relevant art and this specification.

Hereinafter, embodiments of the present system and method are described with reference to the attached drawings.

Figure 1:
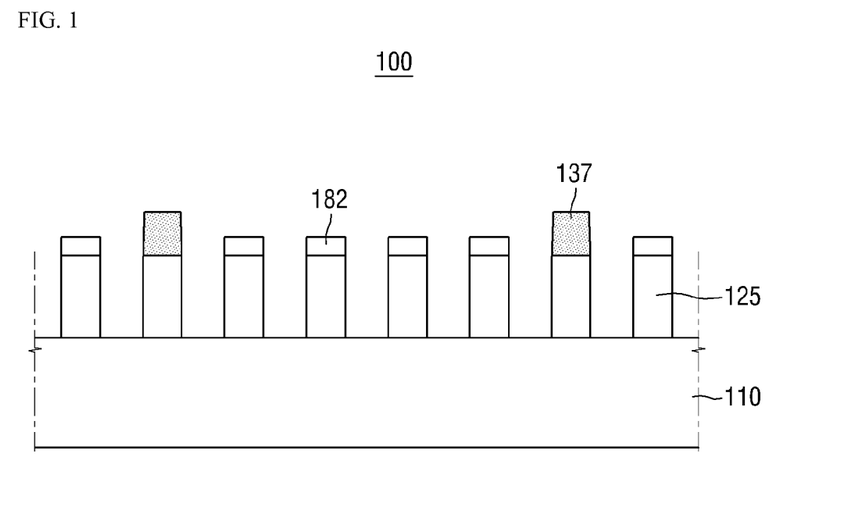
FIG. 1 is a cross-sectional view of a wire grid polarizer according to an embodiment of the present system and method.

FIG. 1 is a cross-sectional view of a wire grid polarizer according to an embodiment of the present system and method. Referring to FIG. 1, the wire grid polarizer 100 includes a substrate 110, a plurality of parallel conductive wire patterns 125 formed on the substrate 110, a remaining guide pattern 137 disposed on some of the conductive wire patterns 125, and a remaining monomer block 182 disposed on the conductive wire patterns 125 that do not have a remaining guide pattern 137.

During a process of etching the conductive wire patterns 125, the etching may be performed so as not to completely etch out guide patterns 135 and monomer blocks 181 (see FIG. 12) in order to prevent over-etching. As a result, portions of the guide patterns 135 and the first monomer blocks 181 remain disposed on the conductive wire patterns 125 as the remaining guide patterns 137 and the remaining monomer blocks 182, respectively.

As FIG. 1 shows, the remaining monomer blocks 182 may be disposed at repeating intervals. For example, a plurality of remaining monomer blocks 182 may be disposed so as to be adjacent to each other and repeatedly disposed with one remaining guide pattern 137 in between. Further, the guide patterns 135 may be formed to have a trapezoidal cross-section so that remaining guide patterns 137 also have a trapezoidal shape. That is, the remaining guide pattern 137 may be formed such that a width of an upper end is smaller than a width of a lower end.

FIG. 1 further shows that the remaining guide pattern 137 may be taller or thicker than the remaining monomer blocks 182. To prevent a block copolymer from overflowing, which is further described below, the guide patterns 135 (see FIG. 9) are formed to be tall so that the remaining guide patterns 137 are formed to be taller than the remaining monomer blocks 182.

As described above, when the distance between the metal wires is shorter than the wavelength of an incident electromagnetic wave, the wire grid polarizer 100 reflects a polarized component of the incident electromagnetic wave that is parallel to the metal wire (an S wave) and transmits a vertical polarized component of the incident electromagnetic wave that is perpendicular to the metal wire (a P wave).

A planar polarizer that has excellent polarization efficiency, a high transmittance, and a wide viewing angle may be fabricated using the above phenomenon. Differently from a linear polarizer, since a conductive wire grid polarizer 100 uses metal, the conductive wire grid polarizer 100 has a high efficiency of reflecting light and is able to re-reflect the reflected light. This allows the conductive wire grid polarizer to reuse the reflected light and make all light components into one polarized light component.

In other words, the reflected light passes through various films and is reflected by a reflector to be converted into a P polarized wave and an S polarized wave and output to a front surface. Because recycled light continuously repeats the above phenomenon, the light efficiency is improved.

Hereinafter, a fabricating method of a wire grid polarizer as described above is described.

Figure 2:
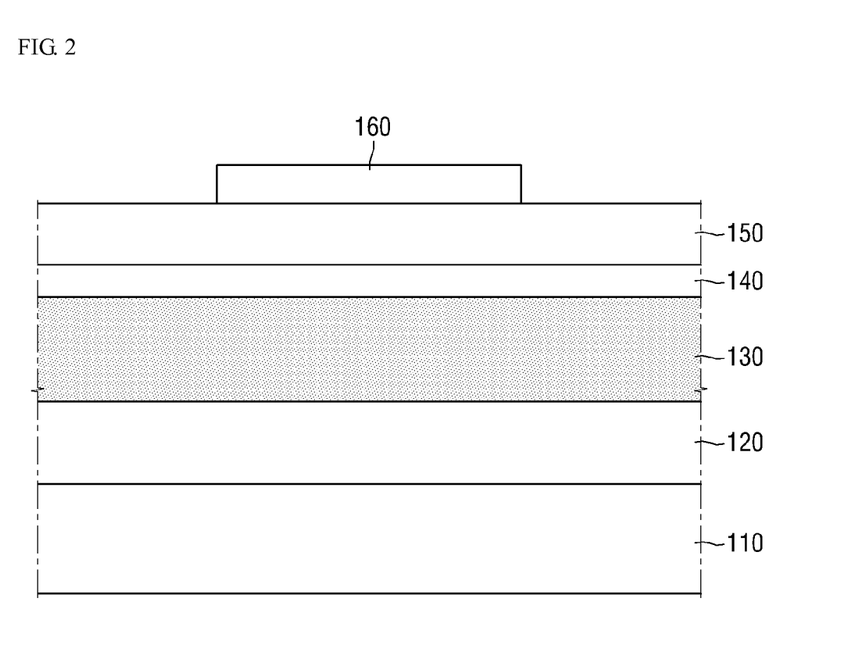
FIGS. 2, 3, 4, 5, 6, 7, 8, 9, 10, 11 and 12 are cross-sectional views of fabricating processes of a wire grid polarizer according to an embodiment of the present system and method.

FIGS. 2 to 12 are cross-sectional views of fabricating processes of a wire grid polarizer according to an embodiment of the present system and method. Referring to FIG. 2, a conductive layer 120 is formed on a substrate 110.

The substrate 110 may be formed of a material that transmits visible rays. The material may be appropriately selected in accordance with a purpose and a process. For example, various polymers, such as glass, quartz, acryl, triacetylcellulose (TAC), cyclic olefin copolymer (COP), a cyclic olefin polymer (COC), polycarbonate (PC), polyethylene naphthalate (PET), polyimide (PI), polyethylene naphthalate (PEN), polyether sulfone (PES), and polyarylate (PAR) may be used in the substrate 110, but the material is not limited thereto. The substrate 110 may be formed of an optical film base material having a predetermined degree of flexibility.

The material of the conductive layer 120 may be a conductive material. In one embodiment, the conductive layer 120 may be formed of a metal. More specifically, the metal may be selected from a group consisting of aluminum (Al), chrome (Cr), silver (Ag), copper (Cu), nickel (Ni), titanium (Ti), cobalt (Co), and molybdenum (Mo) or an alloy thereof, but is not limited thereto.

In some cases, the conductive layer 120 may include two or more layers. For example, a first conductive layer (not illustrated) may include aluminum and a second conductive layer (not illustrated) may include titanium or molybdenum, but the conductive layers are not limited thereto. If the first conductive layer (not illustrated) includes aluminum, hillocks may form depending on the process temperature used in a subsequent process. If hillocks do form, the upper surface may not be uniform, resulting in a product with degraded optical characteristics. To prevent hillocks from forming, the second conductive layer (not illustrated) including titanium or molybdenum may be formed on the first conductive layer (not illustrated). In this way, hillocks that may otherwise form due to a subsequent process are prevented.

As a method of forming the conductive layer 120, a general sputtering method, a chemical vapor deposition (CVD) method, or an evaporation method may be used, but the method is not limited thereto.

Next, a guide layer 130 is formed on the conductive layer 120.

The guide layer 130 may be a soft pattern layer, such as a photoresist, or an organic material or a hard material layer such as metal or an inorganic material. For example, the guide layer 130 may be formed of silicon nitride (SiNx) but is not limited thereto.

Next, a hard mask layer 140 is formed on the guide layer 130.

The hard mask layer 140 may be formed of a material having a high etching selectivity such as a metal or inorganic material. For example, according to an embodiment, a material selected from a group consisting of chrome (Cr), molybdenum (Mo), and a combination thereof may be used, but the material is not limited thereto.

Next, a sacrificial layer 150 is formed on the hard mask layer 140. The sacrificial layer 150 may be a soft pattern layer such as an organic material. The sacrificial layer 150 may use a silicon based insulating material including $SiO_2$ but is not limited thereto.

Next, a photoresist pattern 160 may be formed on the sacrificial layer 150. In one example, the photoresist pattern 160 may be formed by applying a photoresist layer and exposing and developing the photoresist layer using a mask to create the pattern, but is not limited thereto. Various patterning techniques may be used. As described above, the photoresist pattern 160 is formed to expose a part of the sacrificial layer 150.

Figure 3:
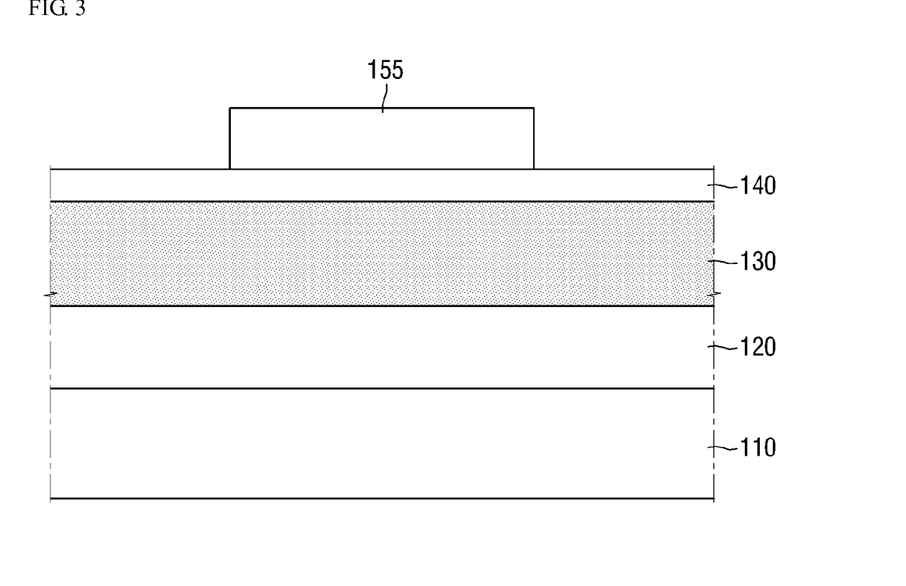

Referring to FIG. 3, the sacrificial layer 150 is etched using the photoresist pattern 160 as an etching mask to form a sacrificial pattern 155. The sacrificial pattern 155 may be formed selectively using dry etching or wet etching depending on the material used for the sacrificial layer 150.

Figure 4:
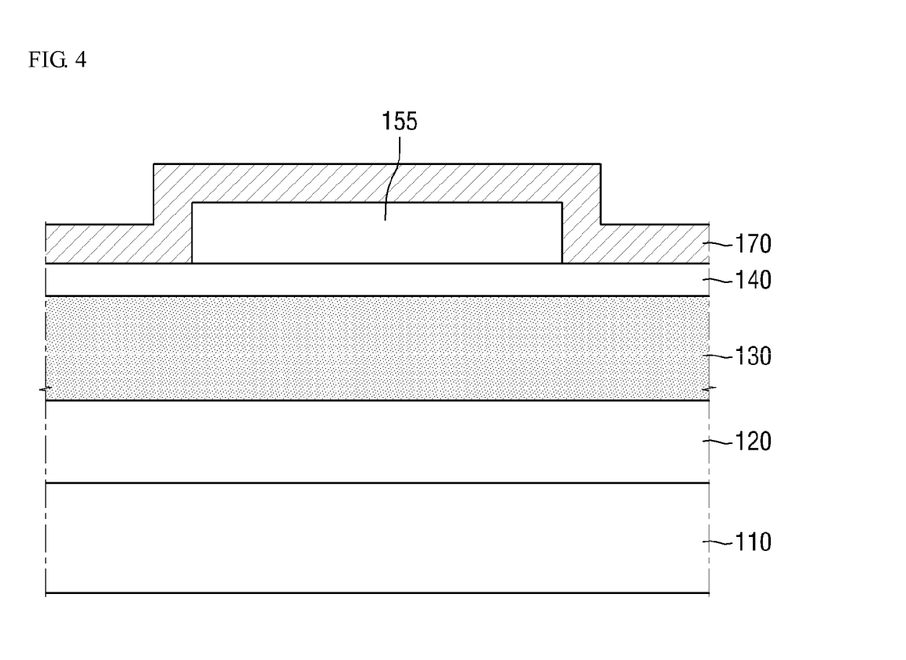

Referring to FIG. 4, a mask material layer 170 is formed on the substrate on which the sacrificial pattern 155 is formed. The mask material layer 170 may be formed of an inorganic material or an organic material.

Figure 5:
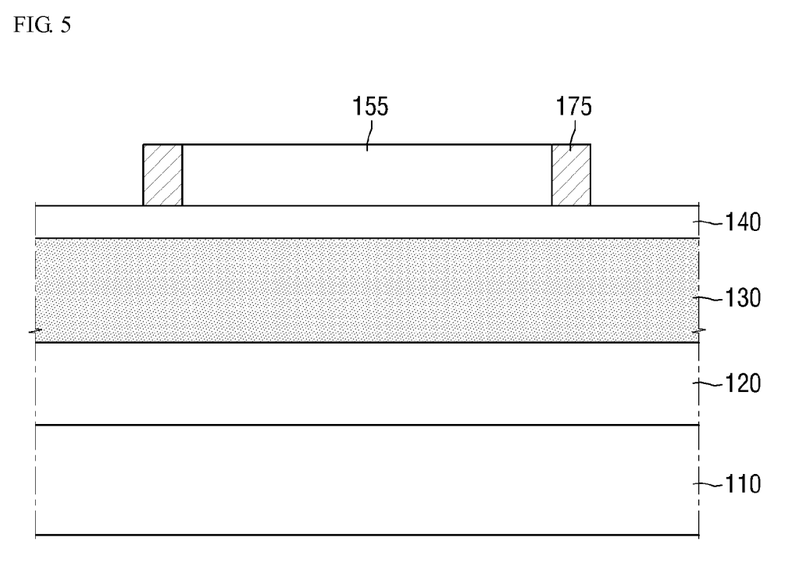

Referring to FIG. 5, the mask material layer 170 is etched to form a mask pattern 175. Through this process, the guide pattern 135, which is formed later, may be formed to have a width that is similar to the width of a monomer block of a block copolymer, which is aligned later.

The mask pattern 175 is etched by an anisotropic etching method, such that a horizontal plane is etched and the mask material layer 170 disposed in a vertical plane remains to form the mask pattern 175. When the mask material layer 170 on the horizontal plane is etched to form the mask pattern 175, a part of the hard mask layer 140 and an upper surface of the sacrificial pattern 155 are exposed.

Figure 6:
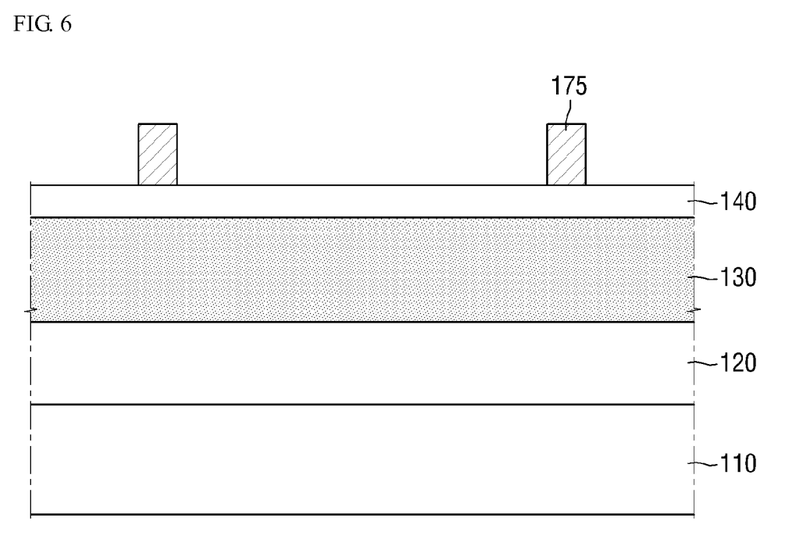

Referring to FIG. 6, the sacrificial pattern 155 is removed using the exposed upper surface of the sacrificial pattern 155. A part of the hard mask layer 140 previously covered by the sacrificial pattern 155 may be exposed by removing the sacrificial pattern 155.

As described above, mask patterns 175, which are disposed with a regular interval, may be disposed on the hard mask layer 140.

Figure 7:
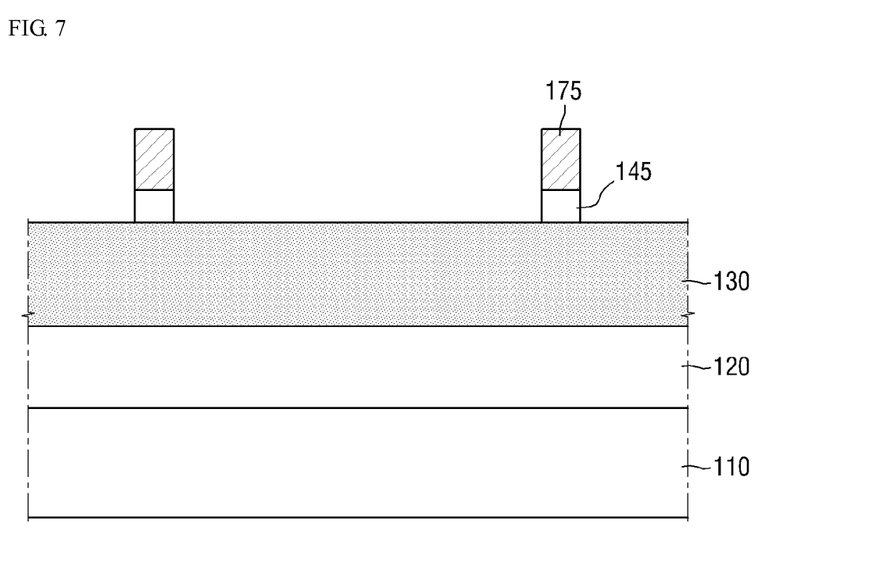

Referring to FIG. 7, the hard mask layer 140 is etched using the mask pattern 175 as a mask to form a hard mask pattern 145. The hard mask layer 140 may be formed of metal such as molybdenum (Mo) or chrome (Cr). Molybdenum (Mo) or chrome (Cr) has a low etching rate in the etching process of the guide pattern 135, which is described below, so that an appearance maintaining rate may be relatively high.

The formed hard mask layer 140 may be etched by a wet etching method.

As described above, the hard mask pattern 145 is formed to expose a part of the guide layer 130 disposed below the hard mask layer 140. Here, as FIG. 7 shows, the mask pattern 175 remains on the hard mask pattern 145.

Figure 8:
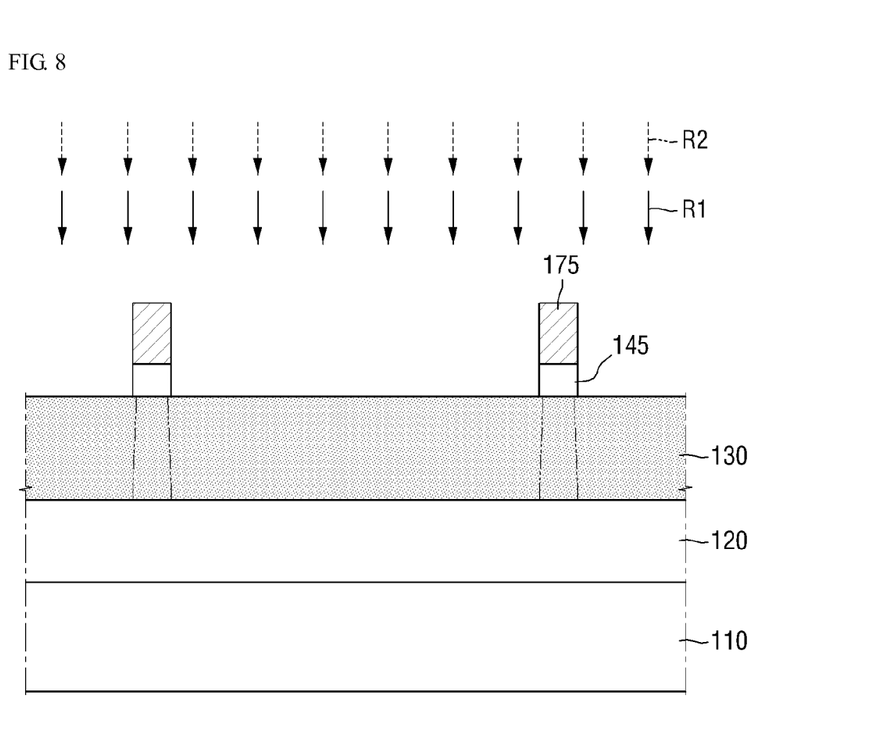

Referring to FIG. 8, an exposed region of the guide layer 130 is etched using the hard mask pattern 145 and the remaining mask pattern 175 as masks. The guide layer 130 may be etched using a plasma etching method.

A step of forming the guide pattern 135 may include isotropically etching the guide layer 130 and anisotropically etching the guide layer 130.

For example, the isotropic etching step may include plasma-etching the guide layer 130 with a first plasma intensity R1, and the anisotropic etching step may include plasma-etching the guide layer 130 with a second plasma intensity R2 that is lower than the first plasma intensity R1, which is described in more detail below.

As another example, the guide layer 130 may be plasma-etched while gradually adjusting the plasma intensity from the first plasma intensity R1 to the second plasma intensity R2. Here, the first plasma intensity R1 is suitable for isotropic etching, and the second plasma intensity R2 is suitable for anisotropic etching.

The plasma intensity may be determined by adjusting the pressure of a chamber in which the plasma is formed, a source power, a bias power, and a gas condition.

More specifically, the first plasma intensity R1 for performing isotropic etching may be achieved by applying a high power to a first electrode of the chamber and inputting a low power to a second electrode. Due to the power difference at the two electrodes, the speed of the plasma ions is increased, thus increasing the plasma intensity. As described above, the first plasma intensity R1 has a higher intensity than the second plasma intensity R2 and is used to perform the isotropic etching.

Different output energy is supplied to the first and second electrodes of the chamber so that the second plasma intensity R2, which has lower energy than the first plasma intensity R1, may be formed. As described above, the second plasma intensity R2, which is lower than the first plasma intensity R1, is used to perform the anisotropic etching.

The plasma etching process may be implemented by oxygen plasma ($O_2$ plasma) processing but is not limited thereto. Any processing capable of performing the anisotropic etching and the isotropic etching of the guide layer 130 may be used. In a specific example, in the case of the oxygen plasma processing, $SF_8$ or CF based gas may be additionally added. Examples of CF-based gas include $C_4F_8$, $CHF_3$, $CH_2F_2$, $C_4F_8$, $CF_4$, $C_2F_6$, but are not limited thereto.

Figure 9:
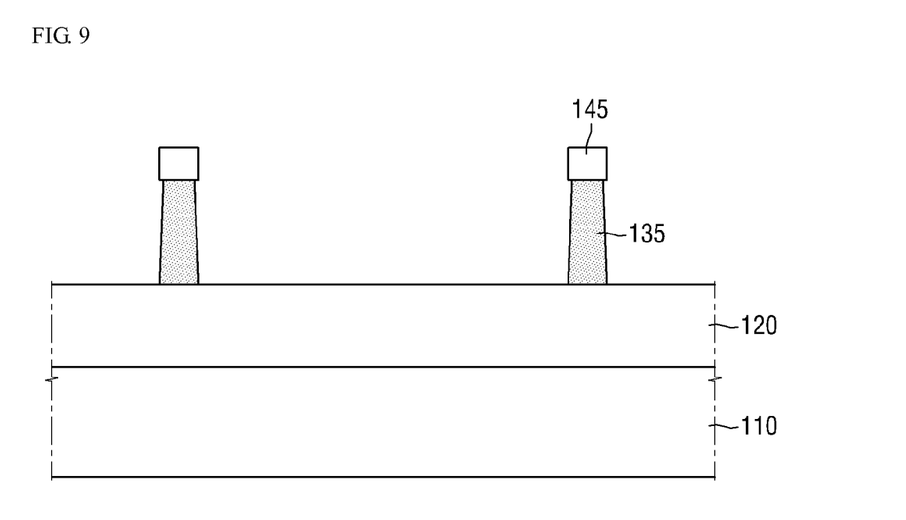

Referring to FIG. 9, the guide layer 130 is plasma etched to form the guide pattern 135, during which the plasma intensity is gradually adjusted.

The guide pattern 135 may be formed such that the width of an upper end adjacent to the hard mask pattern 145 is smaller than the width of a lower end adjacent to the conductive layer 120. Moreover, the width of the upper end of the guide pattern 135 may be smaller than the width of the hard mask pattern 145.

Specifically, as for a shape of the guide pattern 135, the width of the upper end of the guide pattern 135 may be reduced by the isotropic etching step. However, because the hard mask pattern 145 is formed of a material having a low etching rate, as described above, the hard mask pattern 145 is not substantially etched by the isotropic etching step. Consequently, a skew is formed on the upper end of the guide pattern 135 such that the width of the upper end of the guide pattern 135 is smaller than the width of the hard mask pattern 145, such as shown in FIG. 9.

The lower end of the guide pattern 135, on the other hand, is formed by the anisotropic etching step without skew. Therefore, the guide pattern 135 may be formed such that the width of the upper end is smaller than the width of the lower end. That is, a longitudinal cross-sectional shape of the pattern may have a trapezoidal shape or a cross-sectional shape of a bottle having a bottle neck.

As described above, the guide pattern 135 is formed to expose a part of the conductive layer 120.

Figure 10:
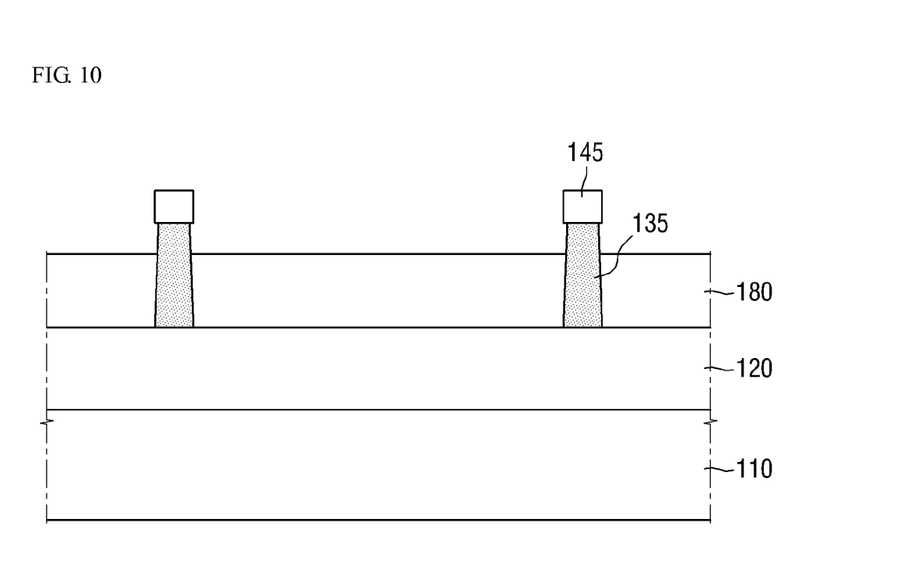

Next, referring to FIG. 10, a block copolymer 180 having two kinds of monomers whose etching rates are different is provided in a space defined by the conductive layer 120 and the guide pattern 135.

The block copolymer 180 may be, for example, a block copolymer of a polystyrene (PS)-polymethyl methacrylate (PMMA) but is not limited thereto.

Figure 11:
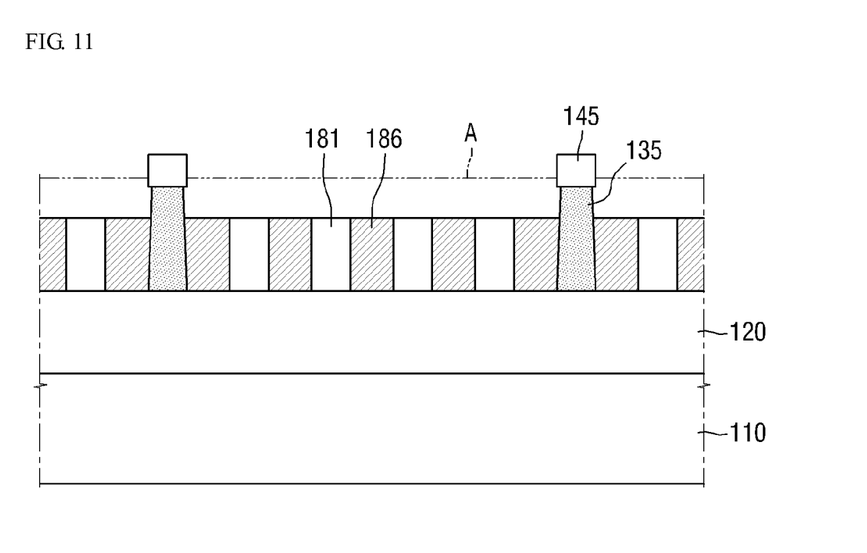

Referring to FIG. 11, the block copolymer 180 having two monomers is aligned to form two kinds of monomer blocks 181 and 186. The block copolymer 180 may be aligned to be phase-separated to the monomer blocks 181 and 186. The monomer blocks 181 and 186 obtained by phase-separating the block copolymer 180 may use materials having different etching rates and different hydrophilicity and hydrophobicity. In this case, although not illustrated in the drawing, a neutral layer may be formed on the bottom in the space defined by the conductive layer 120 and the guide pattern 135 to efficiently align the block copolymer 180.

The neutral layer may use a material that has surface energy substantially similar to the surface energy of the block copolymer 140. For example, the neutral layer may be a random copolymer of monomers of the block copolymer 180 but is not limited thereto. For example, the random copolymer may be a cross linkable random copolymer. In one example, a side of the guide pattern 135 may have selectivity for any one of the monomer blocks 181 and 186. More specifically, the side may be hydrophilic or hydrophobic. This would allow the block copolymer 180 to be more efficiently aligned.

Examples of a method of aligning the block copolymer 180 include thermal annealing and solvent annealing, but are not limited thereto. Generally, as compared with thermal annealing, which applies heat, solvent annealing, which performs annealing in a chamber containing a vaporized solvent, has shorter alignment time. The appropriate annealing method may be selected in accordance with the overall process layout.

As described above, when the annealing process is performed, the height of the guide pattern 135 may be taller than the height of the block copolymer 180 applied. For example, during a solvent annealing process, the vaporized solvent may permeate into the block copolymer 180 and cause swelling. The swelling, in turn, may cause the copolymer to rise beyond the height of the guide pattern 135 and connect to an adjacent block copolymer.

For example, when the hard mask pattern 145 is formed of a material whose etching rate is relatively high, such as aluminum/titanium, the hard mask pattern 145 may be formed to have a rounded shape during the etching of the guide pattern 135. The rounded hard mask pattern may cause a problem during the alignment step of the block copolymer 180 in which the block copolymer 180 climbs up the rounded hard mask pattern and become connected to an adjacent block copolymer 180.

Specifically, if the block copolymer 180 swells to region A illustrated in FIG. 11, and the hard mask pattern is formed to be rounded, the swelling block copolymer 180 may climb up and connect to an adjacent swelling block copolymer 180.

In contrast, because the material for forming the hard mask pattern 145 according to an exemplary embodiment is selected from the group of metal materials consisting of chrome (Cr), molybdenum (Mo), and a combination thereof, the hard mask pattern 145 may maintain its original shape without being rounded. Therefore, even if the block copolymer 180 swells, the block copolymer 180 is prevented from brimming over the hard mask pattern 145 to an adjacent block copolymer 180.

As described above with respect to an embodiment, the guide pattern 135 is isotropically etched such that the width of an upper end of the guide pattern 135 adjacent to the hard mask pattern 145 is smaller than the width of a lower end adjacent to the conductive layer 120, and the width of the upper end of the guide pattern 135 is smaller than the width of the hard mask pattern 145, thereby securing a space where the block copolymer 180 swells. Further, the hard mask pattern 145 disposed on the guide pattern 135 may prevent the block copolymer 180 from brimming over the upper portion of the hard mask pattern 145 when the block copolymer 180 swells.

Therefore, because the guide pattern 135 and the hard mask pattern 145 prevent the block copolymer 180 from brimming over and connecting to an adjacent block copolymer 180, the block copolymers 180 may be smoothly aligned.

Figure 12:
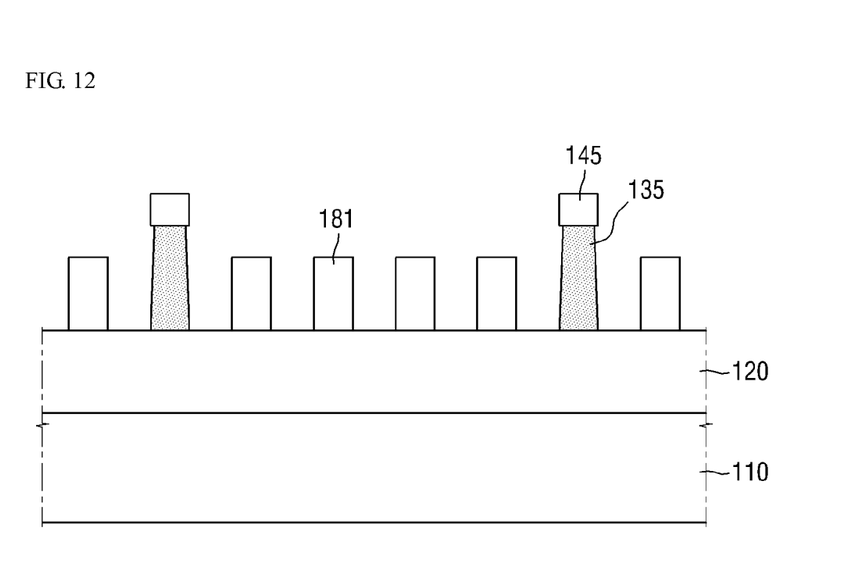

Referring to FIG. 12, one kind of monomer block between the two types of monomer blocks 181 and 186 is selectively removed. Specifically, the second monomer blocks 186, which have a relatively higher etching rate than that of the first monomer blocks 181, are selectively removed.

To selectively remove the second monomer blocks 186, which have a relatively high etching rate, a general etching process may be used. For example, a dry etching process may be performed, but the etching process is not limited thereto. Gas used for the etching may be one or more selected from a group consisting of $O_2$, fluorocarbon gas, and HF, but is not limited thereto. The fluorocarbon gas may be one or more selected from a group consisting of, for example, $C_4F_8$, $CHF_3$, $CH_2F_2$, $C_4F_8$, $CF_4$, and $C_2F_6$, but is not limited thereto.

The first monomer blocks 181 and the guide pattern 135 are used as etching masks to pattern the conductive layer 120 to form the conductive wire pattern 125 shown in FIG. 1. Specifically, the first monomer blocks 181 having a relatively low etching rate and the guide pattern 135 are used as masks to etch the conductive layer 120. By doing this, a plurality of parallel conductive wire patterns 125 may be formed on the substrate 110. Here, the hard mask pattern 145 is also etched along with the conductive layer 120.

During the process of etching the conductive wire pattern 125, the guide patterns 135 and first monomer blocks 181 may not be completely etched out. As a result, the remaining guide patterns 137 and the remaining monomer blocks 182 may be formed on the formed conductive wire pattern 125, such as shown in FIG. 1.

As described above, the remaining monomer blocks 182 may be disposed at repeating intervals. For example, FIG. 12 shows a plurality of monomer blocks 181 disposed so as to be adjacent to each other and repeatedly disposed with one guide pattern 135 in between. FIG. 12 further shows the guide patterns 135 as having a trapezoidal cross-section so that the remaining guide patterns 137 also have a trapezoidal shape.

As described above, the guide patterns 135 are formed to have a trapezoidal cross-section in which the width of the upper end adjacent to the hard mask pattern 145 is smaller than the width of the lower end adjacent to the conductive wire pattern 125, and the width of the upper end of the guide pattern 135 is smaller than the width of the hard mask pattern 145. Such formations prevent a defect in which the block copolymers 180 are connected in the horizontal direction. As a result, the production yield of the wire grid polarizer 100 is improved.

Figure 13:
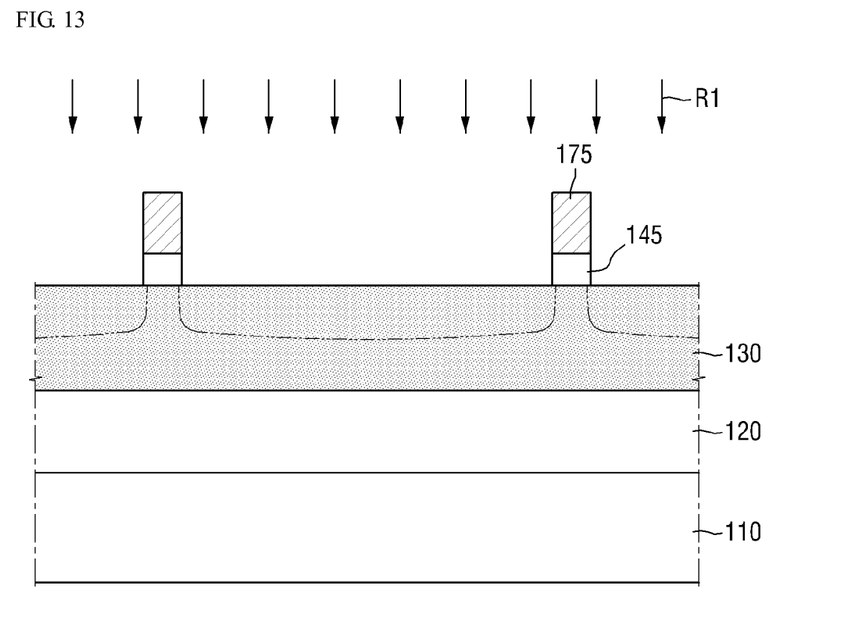
FIGS. 13, 14 and 15 are cross-sectional views of a fabricating method of a wire grid polarizer according to another embodiment of the present system and method.
Figure 14:
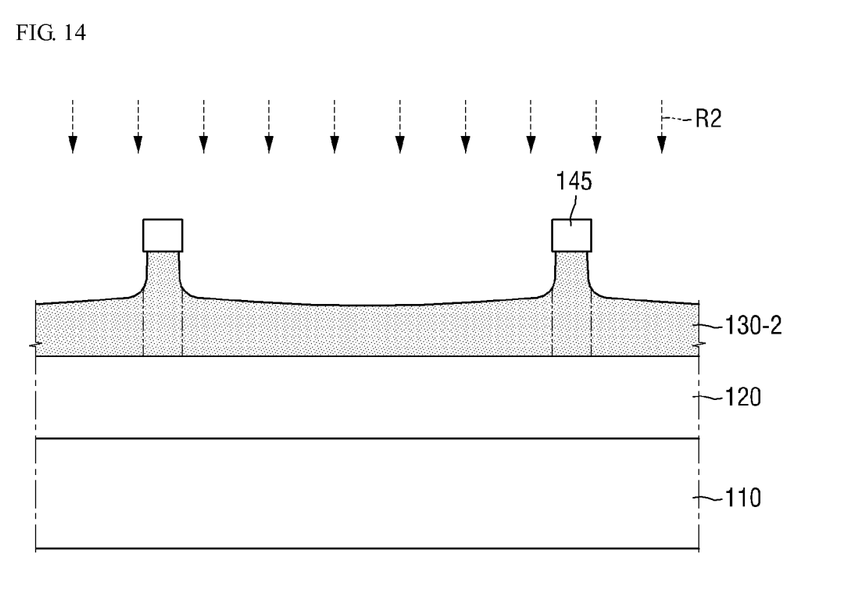
Figure 15:
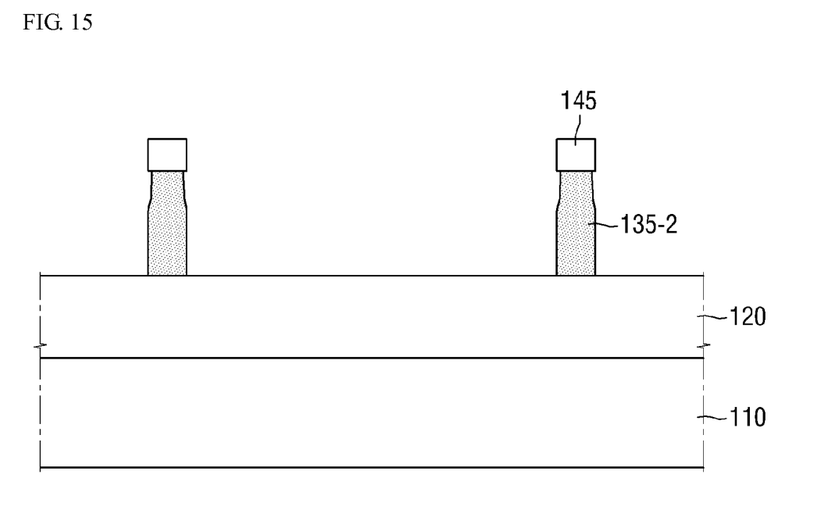

FIGS. 13 to 15 are cross-sectional views of a method of fabricating a wire grid polarizer according to another embodiment of the present system and method. This embodiment is also described with reference to FIGS. 1 to 12. Elements previously described above and common amongst embodiments may be briefly described or omitted to avoid redundancy.

In this embodiment, the same processes from FIGS. 1 to 6 may be performed to fabricate the wire grid polarizer. Further, in the plasma etching process of FIG. 7, a guide pattern 135-2 (see FIG. 15) in which the width of an upper end is smaller than the width of a lower end may be formed by performing the process two times. Specifically, when the guide layer 130 is etched, an isotropic etching process that forms a skew above the guide pattern 135-2 is performed with a first plasma intensity R1, and then an anisotropic etching process that does not form the skew below the guide pattern 135-2 is performed with a second plasma intensity R2. As described above, the plasma etching process for forming the guide pattern 135-2 may be divided into two steps.

Referring to FIG. 13, a conductive layer 120 is formed on a substrate 110, and a hard mask pattern 145 and a sacrificial pattern 175 are formed on the conductive layer 120. Therefore, a part of the guide layer 130 may be exposed.

The guide layer 130 may be etched on the partially exposed substrate with a first plasma intensity R1. Here, the first plasma intensity R1 may isotropically etch the guide layer 130 using the hard mask pattern 145 as a mask. Therefore, an upper end of the isotropically etched guide layer 130-2 may be formed to have a width smaller than that of the hard mask pattern 145.

Referring to FIG. 14, anisotropic etching is performed on the isotropically etched guide layer 130-2 using plasma with a second plasma intensity R2 and the hard mask pattern 145 as a mask. The anisotropic etching with the second plasma intensity R2 may form a pattern having the same width as the hard mask pattern 145 that was used as a mask. Therefore, a lower portion of the isotropically etched guide layer 130-2 may have a steep etched surface due to the anisotropic etching.

Referring to FIG. 15, a guide pattern 135-2 exposing a part of the conductive layer 120 may be formed after applying the processes of FIGS. 13 and 14 to the guide layer 130 and 130-2, respectively.

The guide pattern 135-2 may be formed such that a longitudinal cross-sectional cut has a bottle shape having a bottle neck.

That is, the upper portion of the guide pattern 135-2 having a shape similar to a bottle neck may be formed by the isotropic etching illustrated in FIG. 13, and the lower portion of the guide pattern 135-2 having a steep side may be formed by the anisotropic etching illustrated in FIG. 14.

Next, after forming the guide pattern 135-2, the processes of FIGS. 8 to 12 are performed to form a wire grid polarizer.

As described above, the guide pattern 135-2 is formed by two steps, and as a result, a parallel defect in which adjacent block copolymers are connected by swelling of the block copolymers may be prevented. Specifically, the guide pattern 135-2 may be formed such that the width of an upper end adjacent to the hard mask pattern 145 is smaller than the width of a lower end adjacent to the conductive layer 120, and the width of the upper end of the guide pattern 135-2 is smaller than the width of the hard mask pattern 145, thereby securing a space where the block copolymer swells. Further, the hard mask pattern 145 disposed on the guide pattern 135-2 may prevent the block copolymer 180 from brimming over the upper portion of the hard mask pattern 145 when the block copolymer 180 swells.

Therefore, because the guide pattern 135-2 and the hard mask pattern 145 prevent the block copolymer 180 from brimming over and connecting to an adjacent block copolymer 180, the block copolymers 180 may be smoothly aligned.

Figure 16:
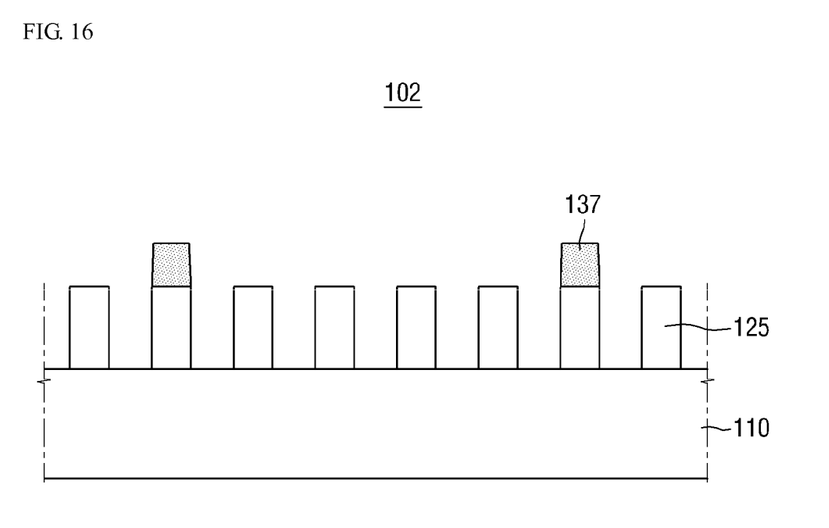
FIG. 16 is a longitudinal-sectional view of a wire grid polarizer according to another embodiment of the present system and method.

FIG. 16 is a longitudinal-sectional view of a wire grid polarizer according to another embodiment of the present system and method. Referring to FIG. 16, the wire grid polarizer 102 includes a substrate 110, a plurality of parallel conductive wire patterns 125 located on the substrate 110, and remaining guide patterns 137 located on certain ones of the conductive wire patterns 125.

As FIG. 16 shows, the remaining guide patterns 137 may be disposed at repeating intervals. Specifically, the conductive wire patterns 125 on which adjacent remaining guide patterns 137 are disposed may be spaced apart by one or more (e.g., four) conductive wire patterns 125 that do not have a remaining guide pattern 137 disposed thereon.

Here, the remaining guide patterns 137 having a trapezoidal cross-sectional shape may remain on certain ones of the conductive wire patterns 125. As illustrated in FIGS. 1 to 12, the guide pattern 135 having a trapezoidal shape may be formed by gradually changing from isotropic etching to anisotropic etching, and as a result, the remaining guide pattern 137 also has a trapezoidal cross-sectional shape. Alternatively, as illustrated in FIGS. 13 to 15, because the guide pattern 135-2 has a bottle shaped cross-section having a bottle neck shape, when the upper end is partially etched by the subsequently performed process, the remaining guide pattern 137 has a quadrangular cross-section.

Figure 17:
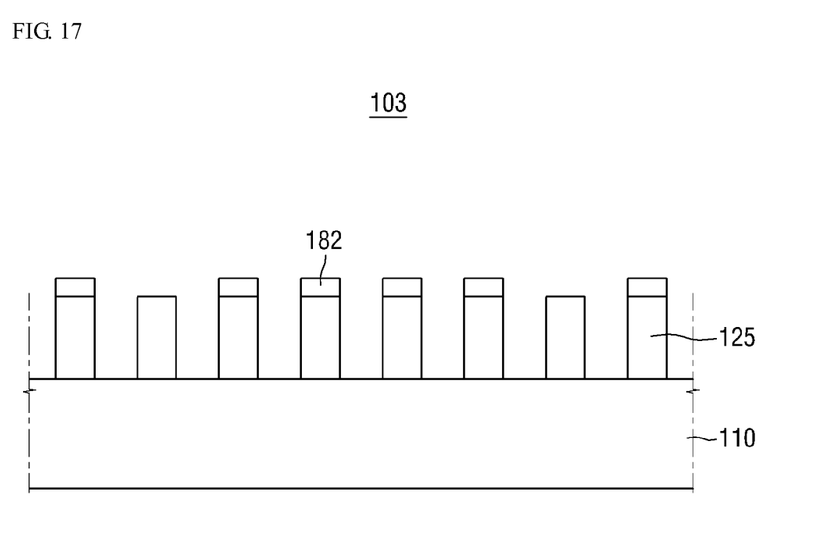
FIG. 17 is a longitudinal-sectional view of a wire grid polarizer according to another embodiment of the present system and method.

FIG. 17 is a longitudinal-sectional view of a wire grid polarizer according to another embodiment of the present system and method. Referring to FIG. 17, the wire grid polarizer 103 includes a substrate 110, a plurality of parallel conductive wire patterns 125 located on the substrate 110, and a remaining monomer block 182 located on certain ones of the conductive wire patterns 125.

As FIG. 17 shows, the remaining monomer blocks 182 may be disposed at repeating intervals on the conductive wire pattern 125. Specifically, a plurality of remaining monomer blocks 182 may be disposed such that parallel conductive wire patterns 125 on which no remaining monomer block 182 is disposed are spaced apart by one or more (e.g., four) conductive wire patterns 125 that have a remaining monomer block 182 disposed thereon.

In contrast to FIG. 1, the remaining guide patterns 137 are removed in FIG. 17. That is, only the remaining monomer blocks 182 are periodically disposed. The remaining guide patterns 137 may be removed by additionally performing a process of removing the guide pattern 135 and the hard mask pattern 145. The guide pattern 135 may be removed together during the etching process through which the conductive wire pattern 125 is formed.

Here, the step of removing the hard mask pattern 145 and the guide pattern 135 may be performed after the process of aligning the block copolymers 180. When the hard mask pattern 145 and the guide pattern 135 are removed after the annealing step to align the block copolymers 180, the parallel defect caused by the brimming over of the block copolymer 180 may be prevented.

Figure 18:
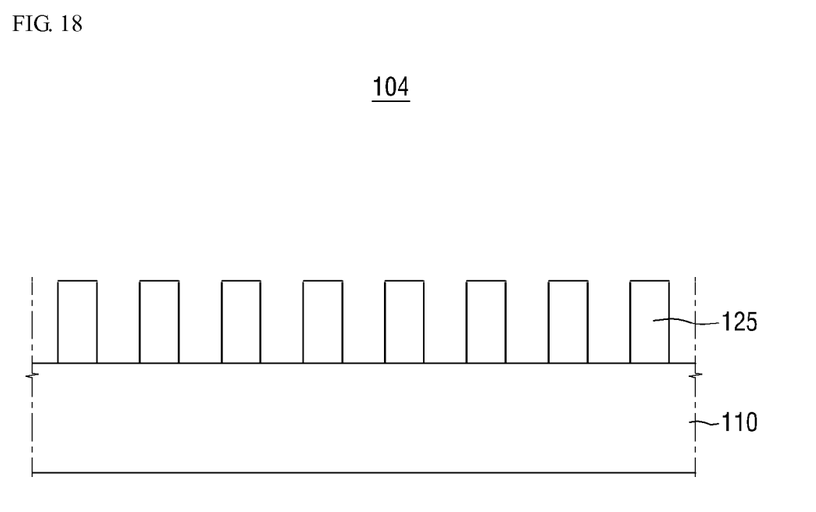
FIG. 18 is a longitudinal-sectional view of a wire grid polarizer according to another embodiment of the present system and method.

FIG. 18 is a longitudinal-sectional view of a wire grid polarizer according to another embodiment of the present system and method. Referring to FIG. 18, a wire grid polarizer 104 includes a substrate 110 and a plurality of parallel conductive wire patterns 125 located on the substrate 110. In contrast to FIG. 1, the remaining guide patterns 137 and remaining monomer blocks 182 are removed while the conductive wire patterns 125 remain disposed with a predetermined interval on the substrate 110.

Like the other embodiments of the present system and method, a step of removing the hard mask pattern 145 and the guide pattern 135 may be performed after the process of aligning the block copolymers 180. When the hard mask pattern 145 and the guide pattern 135 are removed after the annealing step to align the block copolymers 180, the parallel defect caused by the brimming over of the block copolymer 180 may be prevented.

Figure 19:
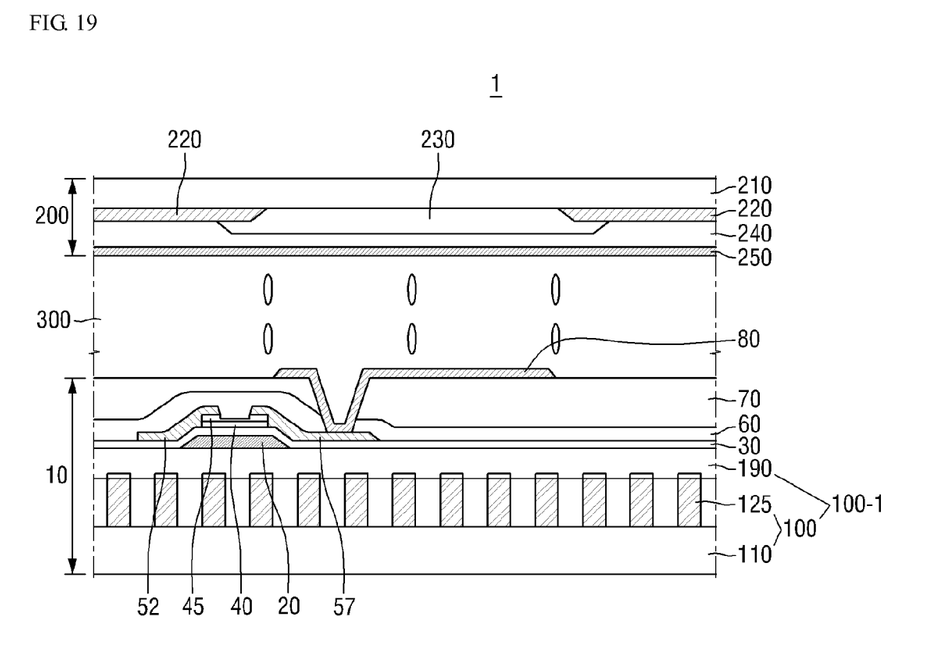
FIG. 19 is a schematic cross-sectional view of a display device including a wire grid polarizer according to an embodiment of the present system and method.

FIG. 19 is a schematic cross-sectional view of a display device including a wire grid polarizer according to an embodiment of the present system and method. Here, a wire grid polarizer is described with reference to FIGS. 1 to 18.

Referring to FIG. 19, a display device 1 includes a first display substrate 10, a second display substrate 200 disposed opposite to the first display substrate 10, and a liquid crystal layer 300 interposed between the first display substrate 10 and the second display substrate 200.

In each display substrate 10 and 200, a plurality of pixels arranged in a matrix may be defined.

In the first display substrate 10, a plurality of gate lines extending in a first direction and a plurality of data lines extending in a second direction perpendicular to the first direction may be formed. A pixel electrode 80 may be disposed at every pixel defined by the gate line and the data line.

A data voltage may be supplied to the pixel electrode 80 through a switching element such as a thin film transistor. A gate electrode 20 serving as a control terminal of the thin film transistor is connected to the gate line, a source electrode 52 serving as an input terminal is connected to the data line, and a drain electrode 57 serving as an output terminal is connected to the pixel electrode 80 through a contact hole. A channel of the thin film transistor may be formed by a semiconductor layer 40. An ohmic contact layer 45 having a high work function may be further disposed between the semiconductor layer 40 and the source/drain electrodes 52 and 57. A dopant is doped on the semiconductor layer 40 so that the ohmic contact layer 45 may have a high work function.

The semiconductor layer 40 may be disposed so as to overlap the gate electrode 20. The source electrode 52 and the drain electrode 57 may be spaced apart from each other with the semiconductor layer 40 therebetween. The pixel electrode 80 and the common electrode 250 generate an electric field to control an alignment direction of liquid crystal molecules of the liquid crystal layer 300 disposed therebetween. The liquid crystal layer 300 may have a twisted nematic (TN) mode having a positive dielectric anisotropy, a vertical alignment (VA) mode or a horizontal alignment (IPS or FFS) mode, but is not limited thereto.

In the second display substrate 200, a color filter 230 may be formed at every pixel. The color filter 230 may include red, green, and blue color filters 230. The red, green, and blue color filters 230 may be alternately arranged. A light shielding pattern 220 may be disposed at a boundary between the color filters 230. Further, the light shielding pattern 220 may be disposed even in a non-display region of the second display substrate 200. The common electrode 250 disposed in the second display substrate 200 may be integrally formed to overlap all the pixels.

Hereinafter, the above-mentioned display device 1 is described in more detail.

The first display substrate 10 may use a wire grid polarization substrate 100-1 as a base substrate. Although the wire grid polarization substrate 100-1 having a wire grid polarizer 100 is representatively described with the example of FIG. 1, the wire grid polarization substrate 100-1 may be, for example, any one of wire grid the polarizers 100, 102, 103, and 104 shown in FIGS. 1, 16, 17, and 18, respectively.

The substrate 110 may be formed of a transparent insulating substrate such as glass or transparent plastic.

The wire grid polarization substrate 100-1 may include a protection layer 190, which protects and insulates the conductive wire pattern 125, on the wire grid polarizer 100.

The wire grid polarization substrate 100-1 includes a plurality of conductive wire patterns 125 located on the substrate 110 and remaining guide patterns 137 disposed on at least certain ones of the conductive wire patterns 125. The remaining guide patterns 137 may be formed such that the width of an upper end is smaller than the width of a lower end. Further, those conductive wire patterns 125 without a remaining guide pattern 137 disposed thereon may instead have a remaining monomer block 182 disposed thereon.

The region where the thin film transistor is located is a region through which light is not transmitted and also referred to herein as a non-opening. In some embodiments, instead of forming the conductive wire pattern 125 in the non-opening, a reflective layer (not illustrated) may be formed in the non-opening. That is, in a position corresponding to the non-opening, a reflective layer on which the conductive wire pattern 125 of the wire grid polarizer 100 is not formed may be formed. In this case, a metallic material having high reflectance reflects the light that is incident onto the non-opening. As a result, the reflected light is used by the opening again, and the brightness of the display device 1 is improved.

A gate line formed of a conductive material and a gate electrode 20 extending from the gate line may be formed on the protection layer 190 of the wire grid polarization substrate 100-1. Although not illustrated in the drawing, the gate line may extend to the non-display region and form a gate pad in the non-display region.

The gate line and the gate electrode 20 are covered by a gate insulating layer 30.

A semiconductor layer 40 and an ohmic contact layer 45 may be formed on the gate insulating layer 30. On the semiconductor layer 40 and the ohmic contact layer 45, a source electrode 52 branched from the data line and a drain electrode 57 spaced apart from the source electrode 52 may be formed. Although not illustrated in the drawing, the data line may extend to the non-display region and form a data pad in the non-display region.

A passivation layer 60 may be formed on the source electrode 52 and the drain electrode 57. The passivation layer 60 may be an insulating layer formed of an insulating material such as a silicon nitride layer, a silicon oxide layer, and a silicon oxynitride layer. An organic layer 70 formed of an organic material may be formed on the passivation layer 60. The passivation layer 60 and the organic layer 70 may be formed even in the non-display region. The passivation layer 60 may be omitted in some embodiments.

A pixel electrode 80 which is formed of a conductive material may be formed at every pixel on the organic layer 70. The pixel electrode 80 may pass through the organic layer 70 and the passivation layer 60 to be electrically connected to the drain electrode 57 through a contact hole exposing the drain electrode 57. The pixel electrode 80 may be formed of indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, an alloy thereof or a laminated layer thereof.

The second display substrate 200 is described below. The second display substrate 200 has a second substrate 210 as a base substrate. The second substrate 210 may be formed of a transparent insulating substrate such as glass or transparent plastic.

The light shielding pattern 220 is formed on the second substrate 210. The light shielding pattern 220 may be formed even in the non-display region.

The color filter 230 may be formed on the light shielding pattern 220 in the display region.

An over-coating layer 240 may be formed on the color filter 230 and the light shielding pattern 220. The over-coating layer 240 may be formed even in the non-display region.

The common electrode 250 may be disposed on the over-coating layer 240. The common electrode 250 may be formed of indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, an alloy thereof or a laminated layer thereof.

The common electrode 250 may be formed to cover the entire display region. However, the common electrode 250 may include a slit or an opening in the display region.

The common electrode 250 may be formed even in a part of the non-display region. In some cases, the common electrode 250 may not be formed around an edge of the second display substrate 200 and the over-coating layer 240 may be exposed.

The first display substrate 10 and the second display substrate 200 are disposed to be opposite to but spaced apart from each other such that the liquid crystal layer 300 may be interposed between the first display substrate 10 and the second display substrate 200. Although not illustrated, an alignment layer may be formed on at least one of the surfaces of the first display substrate 10 and the second display substrate 200 that are in contact with the liquid crystal layer 300. The pixel electrode 80 of the first display substrate 10 and the common electrode 250 of the second display substrate 200 are disposed to be opposite to each other to form an electric field in the liquid crystal layer 300.

As described above, because the wire grid polarization substrate 100-1 uses metal, it has a high light reflecting efficiency and allows the reflected light may be reused. Particularly, the wire grid polarization substrate 100-1 reuses the light to make all light components into one polarized light component. Consequently, when the wire grid polarization substrate 100-1 is applied to the display device 1, the light transmitting efficiency of the display device 1 is increased and the brightness is improved.

The foregoing is illustrative of the present system and method and not limiting thereof. Although exemplary embodiments of the present system and method have been described, those of ordinary skill in the art would appreciate that many modifications to the embodiments are possible without materially departing from the novel teachings and advantages of the present disclosure. Accordingly, all such modifications are included within the scope of the present system and method.

What is claimed is:

1. A method for fabricating a wire grid polarizer, the method comprising:
    forming a conductive layer on a substrate;
    forming a guide layer on the conductive layer;
    forming a hard mask pattern on the guide layer to partially expose the guide layer;
    forming a guide pattern to partially expose the conductive layer by patterning the guide layer using the hard mask pattern as an etching mask;
    providing a block copolymer of two monomers having different etching rates in a space defined by the conductive layer and the guide pattern;
    forming two sets of monomer blocks by aligning the block copolymer of two monomers;
    selectively removing one set of the two sets of monomer blocks; and
    forming a conductive wire pattern by patterning the conductive layer using the remaining set of monomer blocks and the guide pattern as etching masks,
    wherein a width of an upper end of the guide pattern adjacent to the hard mask pattern is smaller than a width of a lower end of the guide pattern adjacent to the conductive layer, and the width of the upper end of the guide pattern is smaller than a width of the hard mask pattern.

2. The method of claim 1, wherein the forming of the hard mask pattern and the guide pattern on the conductive layer includes:
    forming a hard mask layer on the guide layer;
    forming a sacrificial layer on the hard mask layer;
    forming a photoresist pattern on the sacrificial layer to expose a part of the sacrificial layer;
    forming a sacrificial pattern by etching the sacrificial layer to expose a part of the hard mask layer;
    forming a mask material layer on the sacrificial pattern and the exposed hard mask layer;
    forming a mask pattern by etching the mask material layer to expose the sacrificial pattern and a part of the hard mask layer;
    forming the hard mask pattern by etching the hard mask layer exposed by the mask pattern; and
    forming the guide pattern by etching the guide layer exposed by the hard mask pattern.

3. The method of claim 1, wherein the forming of the guide pattern includes isotropically etching the guide layer and anisotropically etching the guide layer.

4. The method of claim 3, wherein the isotropic etching includes plasma-etching the guide layer with a first plasma intensity, and the anisotropic etching includes plasma-etching the guide layer with a second plasma intensity lower than the first plasma intensity.

5. The method of claim 4, wherein the width of the upper end of the guide pattern is smaller than the width of the hard mask pattern due to the isotropic etching.

6. The method of claim 3, wherein the forming of the guide pattern includes plasma etching, and
    the plasma etching includes gradually adjusting the plasma intensity from the first plasma intensity for the isotropic etching to the second plasma intensity for the anisotropic etching.

7. The method of claim 1, wherein the aligning of the block copolymer includes heat annealing or solvent annealing the block copolymer.

8. The method of claim 1, wherein the aligning of the block copolymer includes swelling the block copolymer, and
    the guide pattern and the hard mask pattern prevent the swelling block copolymer from brimming over.

9. The method of claim 1, wherein the hard mask pattern layer includes a metal selected from a group consisting of chrome, molybdenum, and a combination thereof.

10. The method of claim 1, wherein the guide pattern is formed such that a longitudinal cross-section of the guide pattern has a trapezoidal shape or a bottle shape having a bottle neck.

11. The method of claim 1, wherein the guide layer is formed of silicon nitride ($SiN_x$).

12. The method of claim 1, further comprising:
    removing the hard mask pattern after the aligning of the block copolymer.

13. A wire grid polarizer, comprising: a substrate;
a plurality of conductive wire patterns located on the substrate; and a guide pattern disposed on a first subset of the conductive wire patterns;

wherein a width of an upper end of the guide pattern is smaller than a width of a lower end of the guide pattern; and a monomer block disposed on a second subset of the conductive wire patterns.

14. The wire grid polarizer of claim 13, wherein the guide pattern is formed of silicon nitride (SiNx).

15. The wire grid polarizer of claim 13, wherein the guide pattern is formed such that a longitudinal cross-section of the guide pattern has a trapezoidal shape or a bottle shape having a bottle neck.

16. A display device, comprising:

a protection layer disposed on a wire grid polarizer;

a gate line formed on the protection layer and extending in a first direction;

a data line insulated from the gate line and extending in a second direction;

a thin film transistor electrically connected to the gate line and the data line; and a pixel electrode electrically connected to the thin film transistor, wherein the wire grid polarizer includes a plurality of conductive wire patterns located on a substrate; and a guide pattern disposed on a first subset of the conductive wire patterns; and a width of an upper end of the guide pattern is smaller than a width of a lower end of the guide pattern; and a monomer block disposed on a second subset of the conductive wire patterns.

17. The display device of claim 16, wherein the guide pattern is formed such that a longitudinal cross-section of the guide pattern has a trapezoidal shape or a bottle shape having a bottle neck.

* * * * *